United States Patent [19]

Berg et al.

[11] 4,381,137

[45] Apr. 26, 1983

[54] OPTICAL FIBER MODE SEPARATION SYSTEMS

[75] Inventors: David M. Berg; Kenneth J. Teegarden, both of Rochester, N.Y.

[73] Assignee: Hydroacoustics Inc., Rochester, N.Y.

[21] Appl. No.: 240,634

[22] Filed: Mar. 5, 1981

[51] Int. Cl.³ .............................................. G02B 5/14
[52] U.S. Cl. ............................ 350/96.18; 350/96.15; 350/162.12
[58] Field of Search ............... 350/96.15, 96.16, 96.18, 350/96.19, 162.12

[56] References Cited

U.S. PATENT DOCUMENTS

| | | | |
|---|---|---|---|
| 3,677,616 | 7/1972 | Lewis | 350/162.12 |
| 3,828,264 | 8/1974 | Friedl et al. | 350/96.18 |
| 3,931,518 | 1/1976 | Miller | 250/227 |
| 4,019,051 | 4/1977 | Miller | 350/96.15 |
| 4,021,099 | 5/1977 | Kawasaki et al. | 350/96.18 |
| 4,053,764 | 10/1977 | Sierak et al. | 350/96.15 |
| 4,135,780 | 1/1979 | Dyott | 350/96.15 |
| 4,154,529 | 5/1979 | Dyott | 350/96.18 |
| 4,255,021 | 3/1981 | Brundsen | 350/96.15 |
| 4,294,513 | 10/1981 | Nelson et al. | 350/96.15 |

FOREIGN PATENT DOCUMENTS 7811989 6/1979 Netherlands ................. 350/96.15

OTHER PUBLICATIONS

Culshaw, *Electronics Letters,* vol. 15, No. 17, Aug. 1979, "Minimisation of Modal Noise in Optical-Fibre Connectors," pp. 529-531.

*Primary Examiner*—John D. Lee
*Assistant Examiner*—Frank González
*Attorney, Agent, or Firm*—Martin Lukacher

[57] ABSTRACT

When a multimode optical fiber is deformed in accordance with an input signal to be sensed, light from lower order core modes is coupled to higher order core modes. A lens assembly is provided which separates the light in the higher order core modes from the light remaining in the lower order core modes. A spatial filter in the lens assembly enables the lens or lenses therein to couple the separated modes to two different output fibers with high efficiency and low coupling loss. The two signals in the output fibers are processed so that the common components which constitute noise are cancelled, while the signal components are additively combined and appear at the system's output so as to provide a highly sensitive, low noise fiber optic sensor system.

23 Claims, 8 Drawing Figures

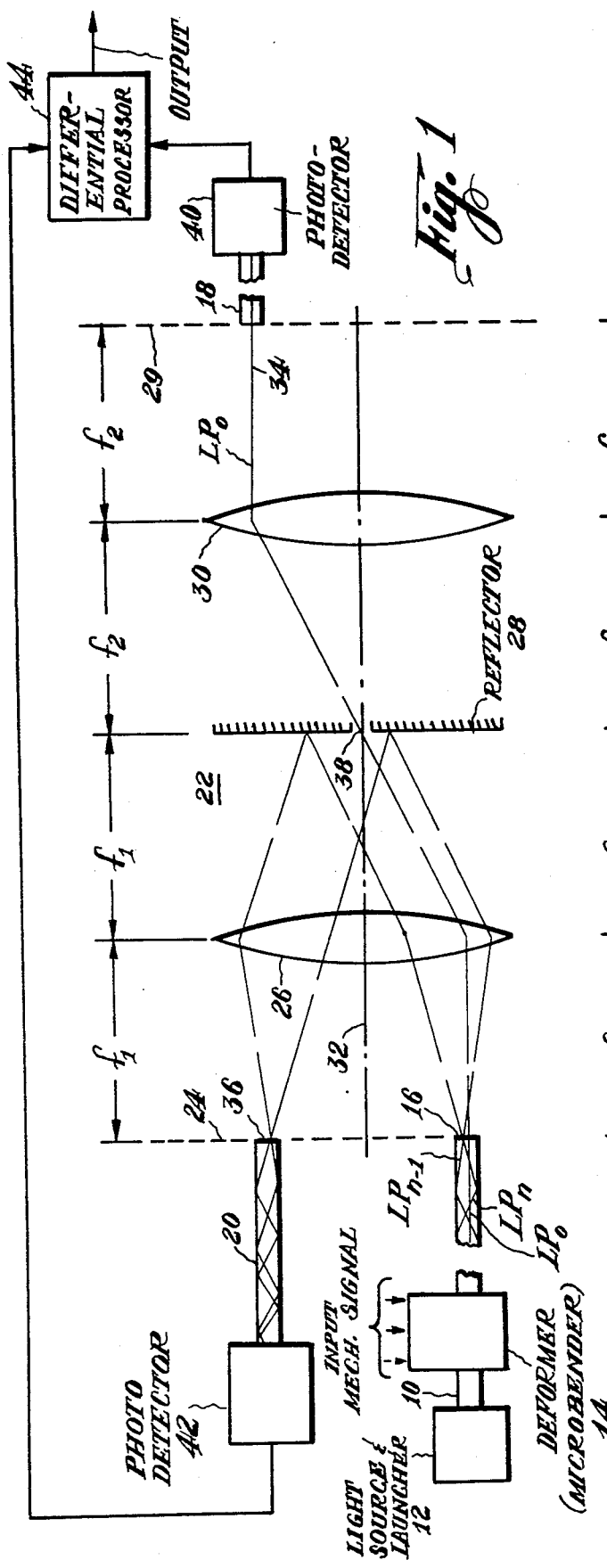
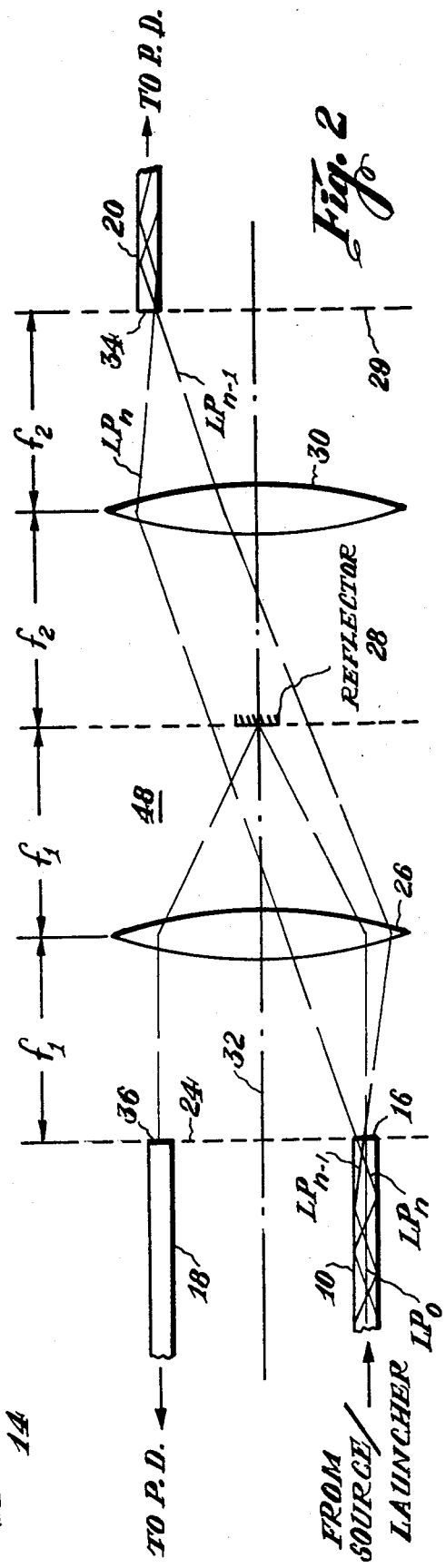

OPTICAL FIBER MODE SEPARATION SYSTEMS

DESCRIPTION

The present invention relates to optical wave guide and optical fiber systems and particularly to an improved sensor system wherein an optical wave guide, such as an optical fiber, is deformed in accordance with the signal to be sensed to vary the transmission through the wave guide in accordance with that signal.

This invention is related to the inventions described in the following patent applications which were filed in the United States Patent and Trademark Office on Sept. 11, 1979 and assigned to the same assignee as the present application: Ser. Nos. 074,270 and 074,268, filed in the names of D. E. Nelson and J. V. Bouyoucos, now U.S. Pat. Nos. 4,294,513 and 4,313,192; and Ser. No. 074,269, filed in the name of J. V. Bouyoucos, now abandoned.

The invention is especially suitable for use in sensor systems for sensing signals represented by or transduced into a mechanical event, such as force, pressure, velocity or acceleration. An optical hydrophone system is an especially suitable application for the invention. The invention, however, is generally useful in optical wave guide or fiber transmission systems as a means for splitting light rays which propagate in a multi-mode optical fiber or wave guide into two or more groups or bundles of rays according to the angle of propagation of the rays at a given transverse plane, and for coupling the split rays with high efficiency and low coupling loss into separate output fibers for further transmission or detection.

The background of optical fiber transmission systems has been described in some detail in the above-referenced patent applications which are filed in the names of Nelson and Bouyoucos (now U.S. Pat. Nos. 4,294,513 and 4,313,192). In summary, the deformation of an optical fiber in order to couple light from lower to higher order propagating modes, and to clad modes, also known as microbend deformation, has been described in Miller, U.S. Pat. Nos. 3,931,518 and 4,019,051, Dyott, U.S. Pat. No. 4,135,780, Jeunhomme and Pocholle, Applied Optics, 14, 2400, October, 1975 and Applied Phys. Lett., 29, 485, October 1976, and Macedo and Litovitz, Netherlands Patent Publication, No. 7811989, published June 14, 1979. The mode coupling due to the deformer may be between core modes and clad modes or between core modes of different order. Separation of the clad modes has heretofore been considered preferable, even though this results in losses in the clad and at the tap to an output optical fiber, and in the requirement that the output fiber be attached near the deformer in order to capture a substantial fraction of the light coupled into the clad.

Although the relationship between modes propagating in a fiber and their far-field radiation pattern has been recognized (see Miller U.S. Pat. No. 3,771,150 and the above-referenced Netherlands Patent Publication), high efficiency, low loss diversion of specific groups of modes from one fiber to another fiber, particularly higher and lower order groups of core modes, has not heretofore been available. The invention provides means for detecting two optical signals from the light which is divided according to the degree of deformation of an input fiber. It avoids the drawbacks of the use of clad modes. The amplitude difference between the signals depends upon the degree of deformation of the input fiber due to the deformer and is highly sensitive to the deformation. The differential processing of the signals provides enhanced sensitivity and reduced noise, as disclosed in the above-referenced application Ser. No. 074,270, filed in the names of Bouyoucos and Nelson (now U.S. Pat. No. 4,294,513).

Accordingly, it is a principal object of the present invention to provide an improved optical wave guide and optical fiber transmission system in which groups of modes propagating in a optical fiber or wave guide may be separated for separate transmission or detection.

It is a further object of the present invention to provide an improved optical wave guide and optical fiber sensor system wherein the relationship between modes propagating in a fiber is varied in accordance with the signal to be sensed and output signals representing the signal to be sensed are detected in accordance with this relationship.

It is a still further object of the present invention to provide an improved optical fiber sensor system wherein an input fiber is deformed and output signals corresponding to the mode distribution in the fiber dependent upon the deformation thereof are obtained, without relying on clad modes.

It is a still further object of the present invention to provide improved optical fiber transmission systems wherein light propagating in different groups of modes is separated and output coupled with high coupling efficiency and low loss.

It is a still further object of the present invention to provide improved optical fiber transmission systems wherein groups of modes propagating in a fiber are separated and directed into separate output fibers for transmission or detection.

It is a still further object of the present invention to provide improved optical fiber transmission systems wherein light propagating in different groups of modes, particularly higher and lower order core modes, is separated for detection into separate output optical fibers with low separation and coupling loss.

It is a still further object of the present invention to provide an improved optical sensor system wherein an optical fiber is acted on by a microbending deformer to change the modes of transmission of light in the fiber wherein photodetection means for deriving electrical signals corresponding to the light propagating in the different modes may be far removed from the deformer, if desired.

It is a still further object of the present invention to provide improved optical fiber transmission systems and optical fiber sensor systems, which have means for separating, transmitting and detecting light which propagates in different modes, which are simple in design and lend ease of fabrication to such systems.

Briefly described, an optical transmission system embodying the invention contains an optical wave guide, such as a multimode optical fiber, from which different components of transmitted light exit at different angles. In an optical sensor or transducer system the light may be coupled into different modes which exit at the different angles by deformer means responsive to a mechanical signal input. Optical apparatus separates the components by providing a spatial Fourier transform of the light which exits from the wave guide at a transform plane. A spatial filter is disposed at the plane and segregates, in accordance with the location thereof at the plane, the different components or propagating modes of the light exiting the wave guide. The spatial filter is preferably reflective, and through the use of a lens which provides the Fourier transform and/or another lens reciprocally disposed to the first lens with respect to the filter, focuses the different components at two or more output fibers or wave guides. The output fibers may be coupled to photodetection means for providing output signals which are differentially processed. The processed output signal is sensitive to the signal to be sensed. Because of the differential processing, the noise background is significantly reduced. Gradient index lenses may be used together with masks so that the system may be fabricated readily, and in a small size, by means of microfabrication techniques.

It will therefore be observed that the invention provides a means for separating two groups of modes propagating in a fiber and directing each group into a separate output fiber for transmission or further detection. If the fiber is a step index, multimode fiber carrying light in two or more groups of core modes, the higher and lower order modes may be separated and injected into separate output fibers. The fraction of the modes transmitted to each of the output fibers is selectable, for example, by changing the size and location of the spatial filter mask.

The invention is described hereinafter in the context of its presently preferred embodiment in an optical sensor system which produces two substantially equal intensity optical signals which propagate in two separate optical fibers, where the difference in the intensities is related to the deformation of an input fiber, which deformation corresponds to an input signal to be sensed; the fibers being step index multimode fibers in which light is injected or launched in a multiplicity of modes. If, for example, the input fiber which is deformed had light launched therein preferentially in only certain core modes, or injected and filtered, for example, by necking down the fiber so that the light 15 propagated only in the certain core modes, and this input fiber is then subject to deformation, the invention may be used to detect both the light coupled from the injected modes to previously unoccupied modes and the light remaining in the injected modes. The system may be designed such that, upon a certain amount of deformation, the majority of the light from the input fiber is directed to one of the output fibers while the other remains relatively dark. For another amount of deformation, the majority of the light from the input fiber is directed to the other output fiber with the first fiber remaining relatively dark. Of course, for intermediate degrees of deformation the light is divided between the two output fibers according to the degree or amount of deformation. The sensor system provides two optical signals which propagate in the different output fibers, the amplitude difference between which depends upon the degree of deformation of the input fiber due to the signal to be sensed, as in the case of the preferred embodiment of this system to be described hereinafter. In the preferred embodiment, light distributed by the deformer among core modes of the input fiber, rather than between core and clad modes, is used.

In the drawings:

FIG. 1 is a schematic diagram illustrating a sensor system embodying the invention;

FIG. 2 is a schematic diagram illustrating an optical transmission system which may be used in the sensor system shown in the FIG. 1 and which is provided in accordance with another embodiment of the invention;

Figure 5:
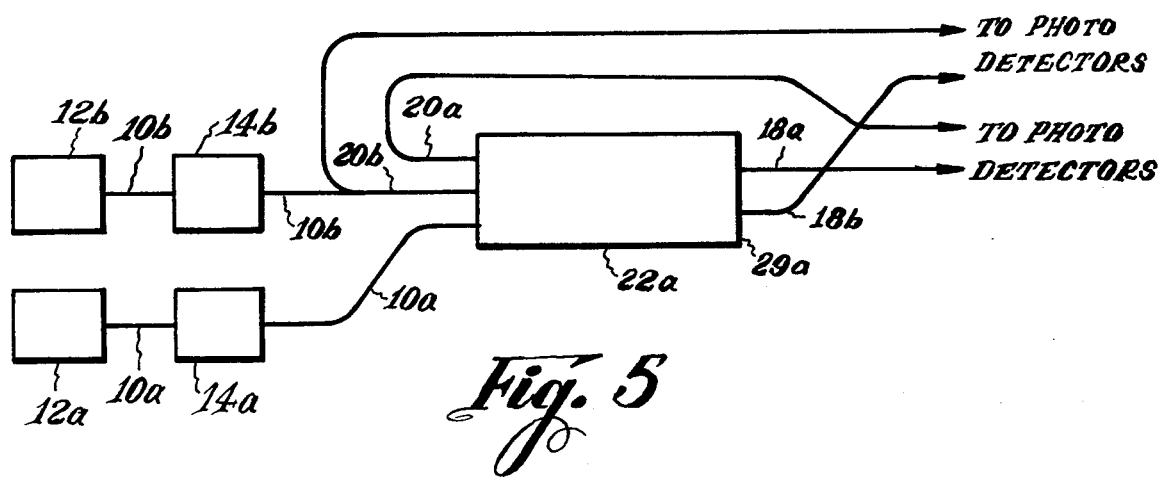
FIG. 5 is a schematic diagram illustrating a sensor system in accordance with another embodiment of the invention wherein a plurality of sensors share the same optical splitter, such splitter being of the type illustrated in FIGS. 1 and 4.
Figure 6A:
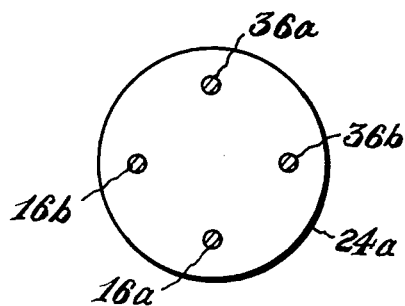
Figure 7:
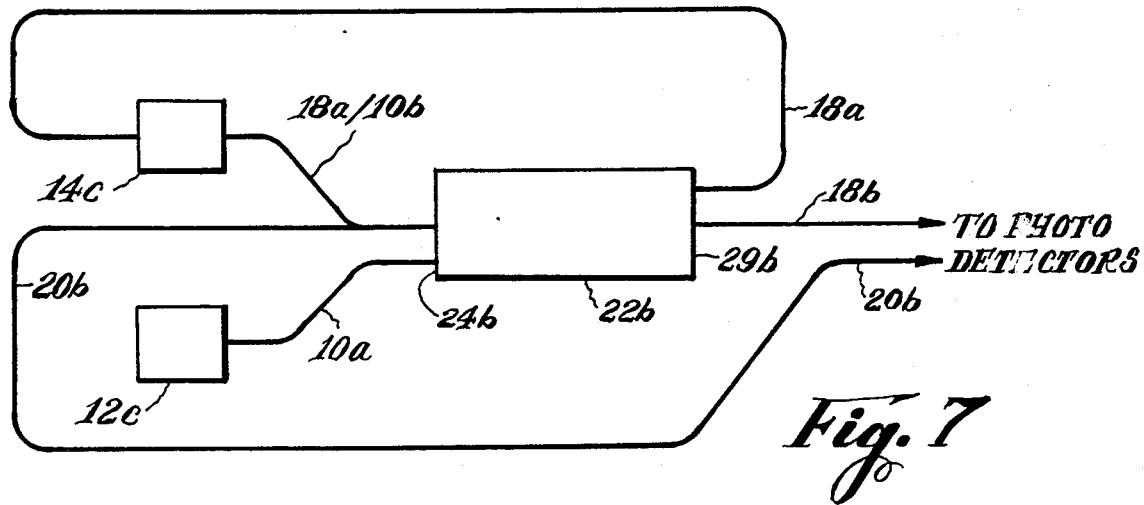

FIGS. 6A and B are end views in the front and rear focal plans, respectively, of different ones of the lenses of the splitter shown in FIG. 5; and FIG. 7 is a schematic diagram of still another embodiment of a sensor system in accordance with the invention.

Referring first to FIG. 1, there is shown an input optical fiber 10. Conventional multimode, step index fibers may be used having a core diameter of from 50 to 400 microns and a clad diameter of from 100 to 600 microns. Although the invention is described in connection with step index fibers, graded index fibers may be used.

A light source 12 with suitable launching optics injects a known distribution of power (a known mode distribution) in the multimode step index input fiber 10. The light source may be a laser. A light emitting diode may also be used. The term "light" as used herein connotes both coherent and incoherent light and radiation over the frequency band which is supported by the fiber, which includes visible and invisible radiation. Suitable launching and coupling structures which may be used in the light source and launcher 12 are described in the text "Optical Fibers for Transmission" by John E. Midwinter, John Wiley & Sons, publisher (1979), see particularly Chapter 13.

The fiber 10 is engaged by a deformer or microbender 14. A grating in the deformer moves in response to an input mechanical signal and acts on the fiber 10 to bend it, thereby changing the mode distribution in the fiber. The lower order modes are shifted or coupled to higher order modes which also propagate along the fiber. The input mechanical signal may be a force, such as applied by a diaphragm when the sensor system is used as a hydrophone or microphone. Force due to movement in a bi-metallic element may be sensed and applied to the deformer whereby to sense temperature. Other parameters which may be transduced into or presented as a mechanical signal can also be applied to the deformer and sensed or measured by the sensor system shown in FIG. 1. Reference may be had to the above-mentioned patent application Ser. No. 074,270, which is filed in the names of Nelson and Bouyoucos for further information respecting the deformer and the various parameters which may be sensed and determined by the system shown in FIG. 1.

Only three linearly propagating modes are shown in the input fiber 10 after the deformer 14 in order to simplify the illustration. These are all core modes. The lower order modes, which leave the end of the fiber essentially as on axis rays, are represented by the ray $LP_0$. The higher order modes, which exit the fiber as rays making a greater angle from the fiber axis than the lower order modes are indicated by two rays $LP_{n-1}$ and $LP_n$.

Although the input fiber is desirably a single fiber which extends all the way from the light source and launcher 12 to the end face 16 thereof which the rays exit, a plurality of fibers may be used as the input fiber with suitable couplings therebetween. Any optical wave guide or fiber may be used to the extent that the angle to the axis of the wave guide or fiber at which the rays leave the fiber (the exit angle) varies in accordance with the information which is transmitted, which in the sensor system is the signal which is being sensed.

Optical means separate or split the light rays propagating in the input fiber 10 in accordance to the angles of exit from the input fiber and inject the light into the two output fibers 18 and 20. The output fibers may be similar to the input fiber 10. Preferably, and in order to provide minimal coupling loss and to maximize the power transfer efficiency, the output fibers should have a core diameter and numerical aperture which is the same or larger than those of the input fiber 10.

The optical means which separate the light in accordance to the angle of propagation is referred to herein as a ray angle sensitive optical splitter 22. It operates to split light propagating in the multimode input fiber into two rays bundles according to the angle of propagation at the end 16 of the fiber. The end 16 is preferably optically flat and normal to the axis of the fiber. It is disposed in a transverse plane 24 which is the front focal plane of a converging lens 26 of the splitter 22. The splitter includes the lens 26, a spatial filter 28 in the Fourier transform plane of the lens 26, i.e., in the back focal plane of the lens 26, and a second converging lens 30. The focal length of the first lens 26 is indicated as $f_1$ and the second lens 30 as $f_2$. These focal lengths may be, and are shown as, the same, or may be different. Both lenses are disposed with their principal axes co-linear and along the same line 32. The back and front focal planes of the lenses 26 and 30, respectively, are in the same plane.

The end surfaces 34 and 36 of the output fibers 18 and 20 are desirably optically flat. The end surface 16 of the input fiber 10 and the end surface 36 of the output fiber 20 are both in the front focal plane 24 of the first lens 26. The end surface 34 is in the back focal plane 29 of the second lens 30. The axes of the fibers 10, 18 and 20 at their end surfaces are desirably normal to the focal planes in which these end surfaces are disposed. In order to make the path from the input fiber 10 to the output fiber 28 and the path from the input fiber 10 to the output fiber 20 reciprocal, both the input fiber 10 and the output fibers 18 and 20 are offset from the principal axis 32. The input fiber 10 and the output fiber 20 are diametrically opposite to each other along a line which extends through the principal axis 32 and are at equal distances from the principal axis. In other words, the axes of the fibers 10 and 20 intersect the front focal plane 24 at points which are equidistant from the intersection of the principal axis 32 with the front focal plane 24. The output fiber 18 may be considered to be disposed along a line in the back focal plane 29 of the second lens 30 which intersects the principal axis 32 and is parallel to the line through the principal axis 32 along which the input fiber 10 and the other output fiber 20 are disposed. The distance between the output fiber 18 and the principal axis 32 is equal to $f_2/f_1$ times either of the equal distances between the input fiber 10 or the other output fiber 20 and the principal axis 32. This arrangement maintains the reciprocal paths between the end 16 of the input fiber 10 and the ends 34 and 36 of the output fibers 18 and 20. The offset arrangement also lends itself to ease of fabrication, especially in the case where $f_1=f_2$, in the location of the fibers with respect to the lenses 26 and 30 and the spatial filter 28.

The spatial filter 28 is a mask which is reflective on the side thereof facing the input fiber 10 and the output fiber 20. The mask has an aperture 38 which may be in the form of a circular hole concentric with the intersection of the principal axis 32 and the focal plane 28 in which the mask is disposed. The spatial filter selects or filters the light from the exit end 16 of the input fiber 10 in accordance with its spatial frequency. This, especially in the case where the input fiber 10 is a step index fiber, is equivalent to separating groups of modes propagating in the input fiber 10; namely separating the lower order modes from the higher order modes. For monochromatic light, this is also equivalent to separating groups of modes according to their propagation constant in the fiber.

Since the deformer varies the modes in which light propagates in the fiber in accordance with the input mechanical signal and particularly into higher order modes when the mechanical signal increases, the splitter 22 provides an efficient low cost means of obtaining two optical signals which vary in accordance with the input mechanical signal.

As the ray diagram in FIG. 1 shows, the end 16 of the input fiber 10 is of much smaller diameter than the focal length of the first lens 26 (i.e., is essentially a point source), such that the light which passes through the lens 26 is substantially collimated. The light pattern at the spatial filter 28 one focal length away from the plane of the lens 26 is the spatial Fourier transform of the light at the end 16 of the input fiber 10. In other words, the light entering the lens 26 is transformed, such that at the spatial filter 28 the position of any ray corresponds to the angle which the exiting ray makes with the exit end 16 of the fiber. In the case of core light from the step index multimode fiber, this angle is the parameter which describes the propagating modes in the fiber. Each mode emerges at a unique angle. This is obvious in the case of the three exemplary modes $LP_0$, $LP_n$ and $LP_{n-1}$. The $LP_0$ lower order modes pass through the aperture 38, while the higher order modes $LP_n$ and $LP_{n-1}$ are reflected by the mask. Thus, in the illustrated case, where the input fiber 10 is a step index multimode fiber, the spatial filter mask precisely distinguishes different groups of modes. As mentioned above, if the fiber is not a step index fiber but of some other type, say graded index, the mask may not distinguish different modes, but will distinguish light according to exit angle and information which depends upon the exit angle, such as the amplitude of an input mechanical signal, may still be extracted by the splitter 22 and the output fibers 18 and 20.

The lens 30 refocuses the light which is transmitted through the mask 28 into a bundle (which contains the lower order modes) at the output fiber 18 and the lens 26 refocuses the light reflected from the mask 28 into another bundle containing the higher order modes at the other output fiber 20. This refocusing occurs at the ends 34 and 36 of the output fibers 18 and 20 because the paths from the mask to the ends 34 and 36 of the output fibers 18 and 20 are reciprocal to the path from the end 16 of the input fiber 10 to the mask. In the case where $f_1=f_2$, all rays arriving at the output fibers are focused so that they arrive at a spot of diameter smaller than or equal to the diameter of the core of the input fiber 10, and at angles smaller than or equal to the maximum ray angle projected from the input fiber. The lenses 26 and 30 provide inverse transforms in the focal planes 24 and 29 where the output fiber ends 34 and 36 are located. Accordingly, by using output fibers having core diameters and numerical apertures the same or larger than those of the input fiber, minimal coupling loss and high efficiency are obtained. In the case where $f_2$ is not equal to $f_1$, the image formed at the end 34 of the output fiber 18 will be larger or smaller respectively, and have maximum angle smaller or larger respectively for $f_2$ longer or shorter, respectively than $f_1$, than the corresponding image if $f_2$ were equal to $f_1$. By choosing an output fiber with appropriate core diameter and numerical aperture, the light from this image can be collected with equally high efficiency as with the two focal lengths equal.

By changing the diameter of the aperture 38 in spatial filter of FIG. 1 or the diameter of the reflector in the spatial filter of FIG. 2, one can choose any ratio of lower to higher order modes which are separated without incurring any additional light loss.

Photodetectors 40 and 42, which may be photodiodes, provide electrical signals to a differential processor 44 from which an output signal is obtained which is highly sensitive to the mechanical signal and has a low noise background. Differential amplifiers may be used in the processor. Digital processing may also be used. Reference may be had to the above-mentioned applications filed in the names of Bouyoucos and Nelson for further information respecting the circuitry of the differential processor 44.

FIG. 2 shows a splitter 48 which is similar to the splitter shown in FIG. 1 except that the spatial filter has its reflecting area in the form of a circular area concentric with the principal axis 32. The lower order mode group is than reflected through the first lens 26 while the higher order mode group is passed by the filter and transmitted to the second lens 30. The output fibers 18 and 20 extend in opposite directions in FIGS. 1 and 2. The operation of the splitters 48 and 22 is exactly equivalent when $f_1=f_2$. The spatial filter mask 28 determines which rays are included in each bundle.

If $f_1$ is not equal to $f_2$, the splitters 22 and 48 will differ in the spatial and angular distributions of output light they provide. For example, if $f_2$ is longer than $f_1$, in the case of splitter 48 (FIG. 2) the output fiber 20, which carries the higher order mode group, will receive a magnified image while the output fiber 18, which carries the lower order mode group, will receive an image of unit size; in the case of splitter 22 (FIG. 1), output fiber 18 receives the magnified image.

The light rays which make up such a magnified image propagate at a smaller angle with respect to the principal axis 32 of the splitter, than the corresponding rays in an image of unit size. Thus in the first case (splitter 48), light is injected into the output fiber 20 at a smaller angle than if $f_1=f_2$ and the difference between the angles at which light is injected into output fibers 18 and 20 is thereby reduced. In the second case, just the opposite is true.

It may be desirable to choose $f_1$ not equal to $f_2$. The conditions explained above then apply. For example, using the splitter in the first case (splitter 48, $f_1$ less than $f_2$) renders the mode distributions in output fibers 18 and 20 more similar and reduces the time dispersion at the photodetectors 40 and 42 between the two output signals. If the output fibers 18 and 20 have appropriately larger core diameters than the input fiber 10, this will not result in any increase in light loss.

Figure 3:
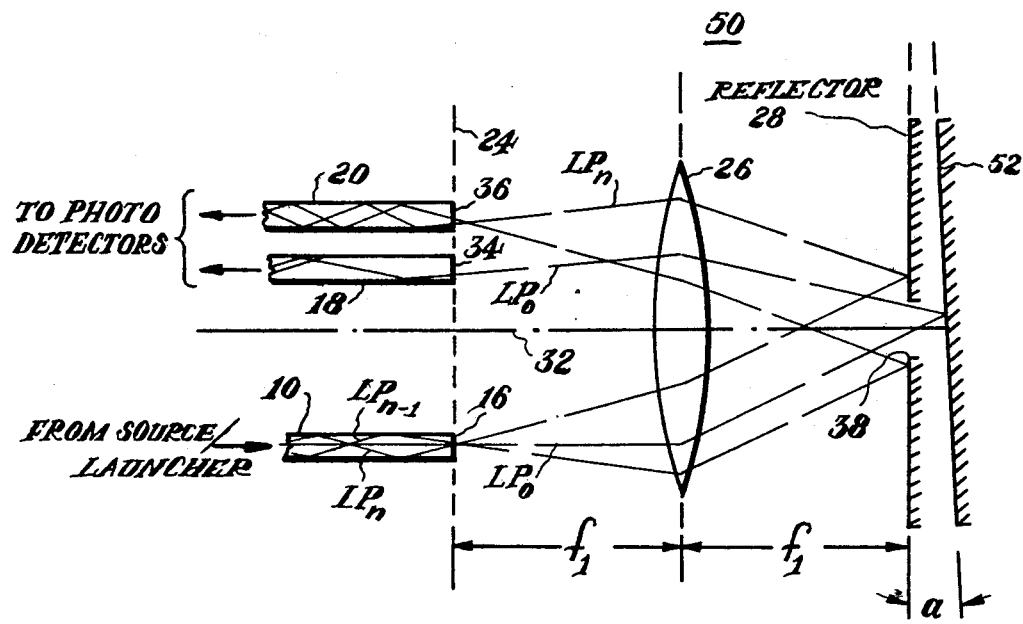
FIG. 3 is a schematic diagram illustrating a fiber optic transmission system in accordance with another embodiment of the invention which may also be used in the sensor system shown in FIG. 1.

A splitter 50 is shown in FIG. 3 which enables both the output fibers 18 and 20 to extend in the same direction as the input fiber 10. The ends 16, 34 and 36 are all in the front focal plane 24. The spatial filter mask 28 is in the back focal plane of the lens 26. In back of the filter 28 is a second reflector 52 which is disposed at a small angle, a, to the back focal plane which is equal to the angle between the principal axis 32 and a normal to the reflector 52. The lower order modes then make a double pass through the lens 26 along a path which is approximately reciprocal to the path of the higher order modes. The lower order modes are focused by the lens 26 at the end 34 of the output fiber 18. Although the reflector 52 and the use of the same lens 26 is not precisely equivalent to the use of a second lens 30, it enables both of the output fibers 18 and 20 to be located on the same side of the lens 26 with the input fiber 10 so as to facilitate the fabrication of the system.

Figure 4:
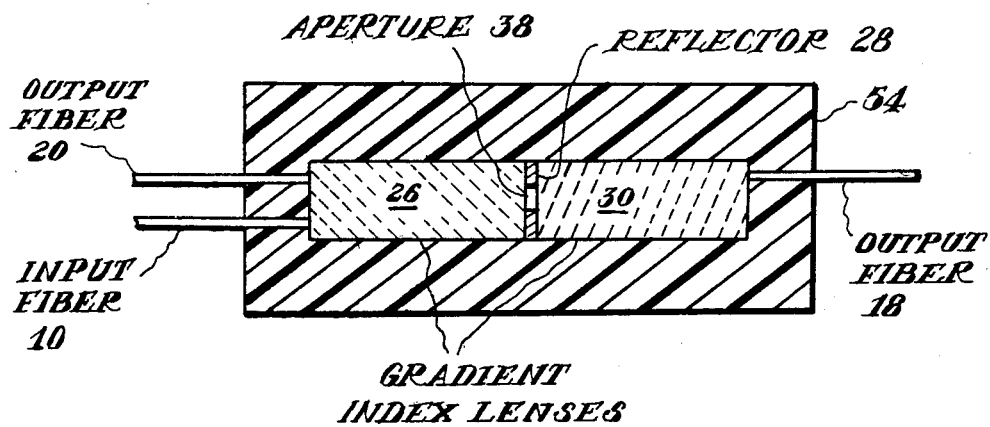
FIG. 4 is a transverse sectional view of a transmission system utilizing gradient index lenses and is similar to the transmission system shown in FIG. 1.

The system shown in FIGS. 1, 2 and 3 may be microfabricated using gradient index lenses as shown in FIG. 4. The lenses 26 and 30 are quarter pitch gradient index lenses, such as lenses sold by Nippon Sheet Glass Co., Ltd., Sumitomo Shinbashi Building, 8-3 Shinbashi 1-Chome, Minato-Ku, Tokyo, Japan under the Tradename "Selfoc" microlens (SML). The spatial filter mask may be a thin aluminum film evaporated onto the rear surface of one of the lenses. With 50 micron core diameter input and output fibers 10, 18 and 20, the aperture 38 may be approximately 200 microns in diameter. The entire splitter may be encapsulated in a housing 54 for support and protection against damage.

Figure 6B:
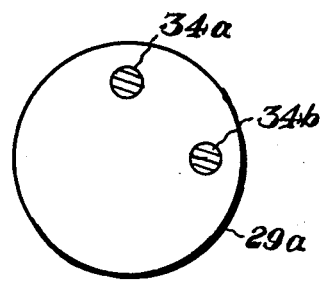

Referring to FIGS. 5, 6A and 6B, there is shown a fiber optic sensor system wherein a plurality of sensors share a single optical transmission system. This transmission system may include a splitter such as shown in FIGS. 1, 2 or 3. For purposes of illustration, the system shown in FIGS. 5 and 6 uses a splitter 22a of the type shown in FIG. 1. As was the case for the splitter 22 shown in FIG. 1, the splitter 22a has an input fiber 10a, the end 16a of which is located in the front focal plane 24a of one lens of the splitter. Again as in splitter 22, the ends 34a and 36a of the output fibers 18a and 20a are located in the back end plane 29a and the front end plane 24a of the splitter 22a, respectively. It will be noted that the splitter 22a may be of the type using gradient index lenses as shown in FIG. 4. Inasmuch as each fiber only takes up a small fraction of the total area of the end planes, more than one set of input and output fibers can be mounted on a single splitter. Since all the light from a given input fiber will be focused only at its two corresponding output fibers, this can be done without incurring cross-talk between the sets. The number of input/output fiber sets which can be mounted on a single splitter is limited only by the physical constraint that the fibers not overlap each other and that they be disposed within the angular acceptance of the lenses which make up the splitter. An additional input/output fiber set is shown by way of illustration in FIGS. 5 and 6. This set is made up of another input fiber 10b and a pair of output fibers 18b and 20b. The end 36b of the output fiber 20b is located in the front end plane 24a along a line through the principal axis 32a of the splitter at a distance from the principal axis 32a equal to the distance between the principal axis 32a and the end 16b of the input fiber 10b. The line between the ends 16b and 36b of the input and output fibers 10b and 20b is perpendicular to a line between the ends 16a and 16b of the input fiber 10a and output fiber 20a, which also extends through the principal axis 32a. The perpendicularity of these two lines is not critical to the operation of the splitter. Any other angle could be used, consistent with the physical constraint that the fibers not overlap. In the back end plane 29a, the end 34b of the output fiber 18b is along a line through the principal axis 32a which is parallel to the line through the principal axis between the ends 16b and 36b of the input and output fibers 10b and 20b which are in the front end plane 24a. The distance between the end 34b and the axis 32a will be equal to the distance between the end 16b and the axis 32b when the focal lengths of the lenses in the splitter 22a are the same. It will be appreciated that a pair of output fibers is provided for each input fiber and disposed with respect to the splitter such that the lower order mode group from the corresponding input fiber is directed to one of the output fibers, and the higher order mode group to the other of the output fibers.

The output fibers are connected to photo detectors. The sensors are provided by the deformers 14a and 14b. A light source and launcher 12a launches light into the input fiber 10a which is deformed by the deformer 14a in accordance with the mechanical signal to be sensed. Similarly another light source 12b launches light into the fiber 10b, and the deformer 14b deforms the fiber 10b in accordance with another mechanical signal to be sensed. The design of these light sources 12a and 12b and deformers 14a and 14b may be the same as the deformers 12 and 14 shown in FIG. 1. It will be observed therefore that an array of sensors, such as an array of optical hydrophones, may share the same splitter and provide separate outputs to two photo detectors and a differential processor for each sensor.

Referring to FIG. 7, a sensor system is shown wherein a splitter 22b, which for example may be of the same type as shown in FIGS. 1 and 4, is used to ensure that only lower order modes of the light from a source 12c are launched into a fiber 18a which passes through a deformer 14c responsive to the mechanical signal to be sent. The light source 12c like the other light sources mentioned above may be a light emitting or laser diode. The input fiber 10a receives this light and transmits it into the splitter 22b. The splitter separates this light into lower and higher order mode groups. The group of lower order modes is coupled to the output fiber 18a. The higher order modes can be allowed to radiate from the splitter by not attaching thereto the complementary output fiber 20a. Alternatively, the fiber 20a may be used and its output allowed to radiate into an absorbing medium. The output fiber 18a is used as the input fiber 10b to the splitter. Accordingly, it is labeled with the reference designation 18a/10b. The deformer 14c deforms this fiber in accordance with the mechanical signal to be sensed. The location and function of this input fiber is the same as input fiber 10b which was described in connection with FIGS. 5 and 6.

The splitter 22b has a second set of output fibers 18b and 20b, also as described in connection with FIGS. 5 and 6. These output fibers lead to photo detectors to provide electrical outputs which may be differentially processed as discussed above in connection with FIG. 1. The system shown in FIG. 7 automatically selects the largest useful group of lower order modes to launch through the deformer 14c. Since the same spatial filter is used in the splitter 22b to select the modes to launch and also differentiate the modes after deformation in the deformer 14c, the system is self-calibrating.

From the foregoing description it will be apparent that there has been provided improved optical fiber transmission systems, and particularly an improved optical fiber sensor system. Variations and modifications of the hereindescribed systems within the scope of the invention will undoubtedly suggest themselves to those skilled in the art. Accordingly, the foregoing description should be taken as illustrative and not in a limiting sense.

We claim:

1. An optical wave guide system comprising an optical wave guide from which guided optical power radiates at different angles depending upon the modes of transmission of the power in the wave guide, optical apparatus for selectively separating said power belonging to said modes of transmission, which apparatus comprises means for providing a spatial Fourier transform of said optical power at a plane, and a spatial filter disposed in said plane.

2. An optical transmission system comprising a wave guide from which different components of transmitted light exit the wave guide at different angles, optical apparatus for separating at least one of said different components, which apparatus comprises means for providing a spatial Fourier transform of the light in a plane, and a spatial filter disposed in said plane.

3. The invention as set forth in claims 1 or 2 wherein said waveguide is an input optical fiber from the end of which light exits, said transform providing means being a converging lens, said input fiber end being disposed in the front focal plane and spaced from the principal axis of said lens, said spatial filter being a mask disposed in the back focal plane of said lens, said spatial filter having reflecting and transmissive areas, a first of said areas intersecting said principal axis and a second of said areas surrounding said first area, first and second output optical fibers, said first output fiber having an end in said front focal plane of said lens offset from said input fiber along a line from said input fiber end through said principal axis a certain distance between said input fiber end and said principal axis, and means for focusing light from the one of said first and second areas which is transmissive at said second optical fiber.

4. The invention as set forth in claim 3 wherein said focusing means is a second converging lens, the back focal plane of said second lens and front focal plane of said first being coincident, the principal axes of said first and second lenses being colinear, said second output fiber having its end in said back focal plane of said second lens along a line through said principal axis parallel to said line in said front focal plane of said first lens and at a distance from said principal axis related to the certain distance between said input fiber end and said principal axis in accordance with the ratio of the focal lengths of said first and second lenses.

5. The invention as set forth in claim 4 wherein said first area is transmissive and is a circular aperture with its center intersected by said principal axis.

6. The invention as set forth in claim 4 wherein said first area is a reflective circular area with its center intersected by said principal axis.

7. The invention as set forth in claim 4 wherein said first and second lenses are gradient index lenses disposed in end to end relationship and with a mask having said reflective and transmissive areas disposed therebetween.

8. The invention as set forth in claim 4 wherein said first and second lenses have focal lengths $f_1$ and $f_2$ respectively, where $f_1 = f_2$.

9. The invention as set forth in claim 4 wherein said first and second lenses have focal lengths $f_1$ and $f_2$ respectively, where $f_1$ and $f_2$ are different.

10. The invention as set forth in claim 4 wherein a plurality of said input optical fibers is provided having ends disposed in said front focal plane, said input fiber ends being spaced from each other in said front focal plane, said first and second output fibers being provided for one of said plurality of input fibers, and a plurality of pairs of output fibers each for a different one of the other of said plurality of input fibers, the end of one of each of said plurality of pairs of output fibers being in said front focal plane of said first lens and the end of the other of each of said plurality of pairs of output fibers being in the back focal plane of said second lens and located therein such that light is focused on each of said pairs of output fiber ends only from the corresponding one of said input fibers.

11. The invention as set forth in claim 3 wherein said first area is transmissive and said second area is reflective, said focusing means being a reflecting surface spaced on the opposite side of said filter from said lens and disposed at such an angle with respect to said back focal plane that light reflected therefrom passes through said first area and said lens and is focused at the end of said second output fiber.

12. The invention as set forth in claim 11 wherein said first area is an aperture intersected by said principal axis.

13. The invention as set forth in claim 3 wherein said output fibers have a core diameter and numerical aperture equal or larger than said input fiber.

14. The invention as set forth in claim 3 wherein a plurality of said input optical fibers is provided having ends disposed in said front focal plane, said input fiber ends being spaced from each other in said front focal plane, said first and second output fibers being provided for at least one of said plurality of input fibers, at least one additional output fiber for each of the other of said plurality of input fibers, and said output fibers being spaced such that light is focused on each of said output fiber ends only from the input fiber corresponding thereto.

15. The invention as set forth in claims 1 or 2 wherein said transform providing means is a converging lens, and said spatial filter is a mask which selectively blocks and transmits light in different areas of said plane.

16. The invention as set forth in claims 1 or 2 wherein said transform providing means is a converging lens having a focal length much greater than the region of said waveguide which illuminates said lens, said region being disposed in the focal plane of said lens on one side thereof, and said plane in which said filter is disposed being the focal plane of said lens on the opposite side thereof.

17. The invention as set forth in claims 1 or 2 wherein said spatial filter is reflective and transmissive in different areas thereof, and means including said transform means for providing an inverse transform of light reflected at said filter and light transmitted therethrough to provide at least two optical outputs.

18. The invention as set forth in claims 1 or 2 wherein means for providing an inverse transform of the light from said spatial filter are provided to provide at least one optical output.

19. An optical system comprising an input optical fiber, a pair of output fibers, means for deforming said input fiber to change the modes of transmission of light in said input fiber, and optical means for separating groups of modes transmitted in said input fiber and directing light propagating in said input fiber in one of said groups including lower order modes to one of said output fibers and another of said groups including higher order modes to the other of said output fibers, said optical means comprising means for providing a spatial Fourier transform of light in the path between said input and output fibers, and a spatial filter in said plane.

20. The invention as set forth in claim 19 further comprising means for processing the light from said output fibers according to the difference in intensity therebetween.

21. The invention as set forth in claim 20 wherein said optical separating means comprises means for spatially filtering and focussing the group containing the lower order modes in said input fiber at different radial positions from the group containing the higher order modes in accordance with the angles at which said groups leave the end of said input fiber, said output fibers being disposed at different ones of said positions.

22. The invention as set forth in claim 19 wherein there are provided a plurality of input fibers and a plurality of pairs of said output fibers, each of said pairs corresponding to a different one of said plurality of input fibers, said input fibers and their corresponding pairs of output fiber being disposed with respect to said separating means such that light propagating in different ones of said groups of modes in each of said input fibers are directed to different ones of the output fibers in the pair of output fibers corresponding thereto.

23. The invention as set forth in claim 19 further comprising a second input fiber, a third output fiber disposed with respect to said separating means for receiving light propagating in a lower order group of modes in said second input fiber, and wherein said third output fiber provides said input fiber.

* * * * *